United States Patent
Rieth et al.

(10) Patent No.: US 6,405,836 B1
(45) Date of Patent: Jun. 18, 2002

(54) ACTUATING UNIT FOR AN ELECTROMECHANICALLY OPERABLE DISC BRAKE

(75) Inventors: Peter Rieth, Eltville; Ralf Schwarz, Heidelberg; Holger Kranlich, Karben; Johann Jungbecker, Badenheim; Stefan Schmitt, Eltville; Oliver Hoffmann, Frankfurt am Main; Joachim Nell, Hanau, all of (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 09/623,567

(22) PCT Filed: Mar. 5, 1999

(86) PCT No.: PCT/EP99/01423

§ 371 (c)(1),
(2), (4) Date: Nov. 21, 2000

(87) PCT Pub. No.: WO99/45292

PCT Pub. Date: Sep. 10, 1999

(30) Foreign Application Priority Data

Mar. 5, 1998 (DE) .......................................... 198 09 362

(51) Int. Cl.[7] .............................................. F16D 65/16
(52) U.S. Cl. ...................... 188/72.1; 188/158; 188/162
(58) Field of Search ........................... 188/72.1, 72.3, 188/158–162; 310/77, 93, 103, 109

(56) References Cited

U.S. PATENT DOCUMENTS

| 2,988,609 | A |   | 6/1961  | Evans |          |
|-----------|---|---|---------|-------|----------|
| 4,793,447 | A | * | 12/1988 | Taig et al. | 188/72.1 |
| 4,850,457 | A | * | 7/1989  | Taig  | 188/72.1 |
| 5,107,967 | A |   | 4/1992  | Fujita et al. | |
| 5,829,557 | A | * | 11/1998 | Halasy-Wimmer et al. | 188/162 |
| 5,931,269 | A | * | 8/1999  | Kingston et al. | 188/162 |
| 6,000,507 | A | * | 12/1999 | Bohm et al. | 188/158 |
| 6,158,558 | A | * | 12/2000 | Bill et al. | 188/162 |
| 6,230,854 | B1| * | 5/2001  | Schwarz et al. | 188/156 |
| 6,315,086 | B1| * | 11/2001 | Schmitt et al. | 188/72.7 |
| 6,315,092 | B1| * | 11/2001 | Schwarz | 188/162 |
| 6,325,180 | B1| * | 12/2001 | De Vries et al. | 188/72.1 |

FOREIGN PATENT DOCUMENTS

| DE | 195 11 287 | 1/1996  |
| DE | 195 43 098 | 12/1996 |
| DE | 196 05 988 | 8/1997  |
| DE | 196 20 344 | 8/1997  |
| DE | 196 11 910 | 10/1997 |
| DE | 196 29 936 | 11/1997 |
| DE | 196 28 804 | 1/1998  |
| WO | 97 17553   | 5/1997  |
| WO | 99 21266   | 4/1999  |

OTHER PUBLICATIONS

Balz et al.: "Konzept für eine elektromechanische Fahrzeugbremse"; ATZ, vol. 98, Ed. 6, p. 328–333 (1996).

* cited by examiner

*Primary Examiner*—Chris Schwartz
(74) *Attorney, Agent, or Firm*—Rader, Fishman & Grauer PLLC

(57) ABSTRACT

The present invention discloses an actuating unit for an electromechanically operable disc brake for automotive vehicles which is generally comprised of a drive unit or an electric motor, an actuating element, by means of which one of two friction linings that are slidably arranged in a brake caliper is moved into engagement with a brake disc, as well as a first and a second reduction gear. In order to uncouple the second reduction gear from the first reduction gear, it is disclosed in the present invention that the electric motor, the first reduction gear, and the second reduction gear are configured as at least two assemblies which can be handled independently.

43 Claims, 4 Drawing Sheets

ACTUATING UNIT FOR AN ELECTROMECHANICALLY OPERABLE DISC BRAKE

TECHNICAL FIELD

The present invention generally relates to vehicle brakes and more particularly relates to an actuating unit for an electromechanically operable disc brake for automotive vehicles which is arranged on a brake caliper.

BACKGROUND OF THE INVENTION

An electromechanical actuating unit of this general type is disclosed in DE 195 11 287 A1. In the actuating unit known in the art, the electric motor, by the intermediary of a planetary gear, drives the thread nut of a roller-and-thread drive whose threaded spindle actuates the first friction lining. The rotor of the electric motor additionally serves as the sun wheel of the planetary gearing, whose planet pinions are mounted in the thread nut and cooperate with a hollow wheel designed in the brake caliper. By way of the thread nut, the rotor is supported in a central bearing arranged in the brake caliper.

The state of the art actuating unit has disadvantages inasmuch as, during its actuation, disturbances which are due to the clamping force of the electromechanical brake and also the transverse forces and bending moments which occur during operation are transmitted via the roller-and-thread drive to the rotor so that it is impossible to guarantee the presence of a constant air gap between the stator and the rotor. This impairs the rate of efficiency of the above-mentioned arrangement. Further, the rotor which is used as the sun wheel of the planetary gearing may become damaged by the effect of the above-mentioned forces or bending moments which may lead to an inclined positioning in relation to the stator.

Therefore, an object of the present invention is to improve upon an electromechanic actuating unit of the type initially referred to in such a manner that the second reduction gear is uncoupled from the first reduction gear so that an equal position of the rotor relative to the planet pinions as well as of the planet pinions relative to the hollow wheel can be ensured.

According to the present invention, this object is achieved in that the electric motor, the first reduction gear, and the second reduction gear are configured as at least two assemblies which can be handled independently, so that the electric motor is arranged outside of the flux of force of the clamping force and its operation cannot be impaired by interferences.

To specify the idea of the present invention, the electric motor, the first reduction gear, and the second reduction gear are configured as each one assembly which can be handled independently. An electromechanic actuating unit of such a construction is distinguished by a high rate of efficiency, an extraordinary dynamics of brake actuation, and an extremely compact type of construction permitting the transmission of high mass-related brake torques. Further, the modular-design assemblies can be manufactured and tested separately.

In a favorable improvement of the object of the present invention, the second reduction gear is arranged on the side of the electric motor remote from the brake linings. This measure permits uncoupling the second reduction gear from the first reduction gear in terms of construction so that deformation of the second reduction gear is reliably prevented and constant clearances may be maintained within the gear.

In another favorable embodiment of this invention, a short force transmission travel of the clamping force is achieved because the first reduction gear is configured as a roll-body and thread drive whose thread nut cooperates with the second reduction gear.

Alternatively, the first reduction gear can be designed as a roll-body and thread drive whose threaded spindle cooperates with the second reduction gear. This measure achieves optimizing the central bearing which cooperates with the threaded spindle.

In another favorable aspect of the present invention, the first reduction gear is configured as a roller-and-thread drive, preferably a roller-and-thread drive with an inward roller return arrangement. Optimal force transmission can be achieved due to the high load capacities of the thread rollers, and the inward return arrangement of the thread rollers permits an easy manufacture of the thread nut.

In another embodiment of the present invention which distinguishes particularly by a low sensitivity to transverse forces, the first reduction gear is configured as a ball-and-thread drive.

In this arrangement, it is especially advantageous that the actuating element is in a force-transmitting connection with the threaded spindle of the roll-body and thread drive and is formed of a force transmission plate which is guided in an annular housing in which the roll-body and thread drive is incorporated. Preferably, the force transmission plate includes at least two radially opposite guiding pins which are accommodated by correspondingly designed guiding surfaces in the housing. These measures permit achieving an effective isolation of the clamping force from the transverse forces which occur during operation and are introduced into the brake caliper.

In another favorable embodiment of the present invention, the thread nut is axially supported on a bearing ring arranged in the housing, and a force sensor is arranged between the bearing ring and the housing. These measures permit realizing a concept with a very short flux of force, with the force sensor representing a component which is arranged in the flux of force, yet is not entrained in movement.

In still another favorable aspect of the present invention, a favorable distribution of load in the ball-and-thread drive is achieved by a conical bore incorporated in the threaded spindle of the ball-and-thread drive in which a push rod is received which serves to transmit pressure forces and the ends of which are supported in an axial extension of the force transmission plate or on the bottom of the bore in a rotationally fixed manner. The threaded spindle is only tensilely loaded due to these measures, and the load portions of the indivdiual balls are rendered more uniform.

To effectively protect the actuating mechanism, especially against contaminants, for example splash water, an elastic seal is provided between the force transmission plate and the housing in another advantageous aspect of the present invention.

In order to considerably reduce the necessary drive torque to be generated by the electric motor, the second reduction gear is configured as a planetary gearing. The planetary gearing is a non-friction gear in which shape variation is not needed and by which high efficiency in little mounting space can be reached.

A higher gear ratio is achieved in another embodiment of the object of the present invention in that the second reduction gear is designed as a planetary gearing with stepped planet pinions.

The attainable gear ratio can be increased further in that the planet pinions with their first step are in engagement with a sun wheel, while the planet pinions with their second step are in engagement with a hollow wheel, by the intermediary of each one spur wheel. However, it is also easily possible to design the second reduction gear as a two-step differential planetary gearing. In the latter type of gearing, an optimal overall length is achieved by using a larger sun wheel.

In another favorable aspect of the object of the present invention, mounting space is optimized because the sun wheel of the planetary gearing is designed on the rotor, while the planet pinions are mounted in a pinion cage that is in a force-transmitting connection with the thread nut. The planet pinions are comprised of each one first large-diameter planet pinion that is in engagement with the sun wheel and each one smaller-diameter second planet pinion that is in engagement with a hollow wheel. The hollow wheel of the planetary gearing is preferably formed of an internally toothed outer ring of a radial bearing in which the pinion cage is supported. These measures achieve a high degree of integration of the arrangement.

The transverse forces which occur during operation are effectively uncoupled in another preferred aspect of the present invention because the actuating element is the thread nut of the roll-body and thread drive.

Uncoupling of the flux of force from the drive unit or the electric motor is ensured according to another feature of the present invention in that there is provision of a guiding element that embraces the thread nut and is supported on an annular housing receiving the roll-body and thread drive. The threaded spindle is axially supported on the guiding element. The axial support of the threaded spindle is effected by means of a radial bead by the intermediary of an axial bearing. This renders it possible to use a bearing with a very small diameter.

Further, it is especially favorable that force-measuring elements are arranged on the guiding element so that force measurements can be performed on the part that is not entrained in movement and subjected to a defined deformation.

An effective protection of the arrangement against contaminants and the ingress of water is reached by an elastic seal or gasket that is interposed between the thread nut and the guiding element.

A direct introduction of the transverse forces which occur during operation into the housing of the first reduction gear is effected in that the thread nut on its end close to the first friction lining is guided in a guiding ring. In order to effectively protect also this arrangement against the ingress of contaminants, e.g. splash water, an elastic seal or gasket is provided between the thread nut and the guiding ring.

In another favorable embodiment of the object of the present invention, the sun wheel of the planetary gearing is provided on the rotor, while the planet pinions are mounted in a pinion cage that is in a force-transmitting connection with the threaded spindle and are comprised of a first large-diameter planet pinion that is in engagement with the sun wheel and a second smaller-diameter planet pinion that is in engagement with a hollow wheel.

In the above-mentioned embodiment, the mounting space is optimized in that the hollow wheel of the planetary gearing is formed of an internal toothing which is provided in a cover that represents a casing of the planetary gearing and is arranged on the housing of the electric motor.

The assembly of the actuating unit of the present invention is considerably simplified in another embodiment of the object of the present invention in that the force is transmitted between the pinion cage and the threaded spindle by means of a form-locking plug coupling.

In a low-cost design of the actuating unit of the present invention, the pinion cage is mounted in the cover by means of a radial bearing. A planetary gearing of this type is easy to manufacture and can be tested separately.

It is expedient when the form-locking plug coupling is coupled to the pinion cage in a torsionally resistant, radially yielding and flexible manner. This measure ensures an effective isolation from interferences.

The threaded spindle may preferably have a one-part or multi-part design.

Another favorable embodiment of the object of the present invention is characterized in that the thread nut at its end remote from the first friction lining includes an axial projection which is movable into abutment on a stop that is designed on the threaded spindle also in an axial direction and acts in a circumferential direction. It is achieved by this measure that in particular in a faulty release action, where the thread nut is turned backwards until its stop, the first reduction gear will not be twisted or jammed.

In order to simultaneously fulfil a parking brake function with the actuating unit of the present invention, it is proposed that electromechanical means be provided which allow mechanically locking the rotor of the electric motor.

In a particularly fail-safe design which is based on the form-lock principle, the means is formed of a toothed rim connected to the rotor and an electromagnetically operable lock pawl.

The lock pawl preferably includes catching means which permit locking engagement both in the actuated and the non-actuated position.

In further favorable embodiments of the present invention, the electric motor may be configured as an electronically commutated electric motor energized by a permanent magnet (direct-current motor without brushes) or as a switch reluctance motor (SR motor).

The mentioned types of motors are especially suitable for producing high torques during standstill.

In order to electronically commutate the motor of the actuating unit it is required to arrange for a position detection system which renders possible to detect the position of the rotor of the electric motor relative to the stator and preferably includes a Hall sensor or a magnetoresistive element.

The present invention will be explained in detail in the following description of three embodiments by making reference to the accompanying drawings.

DETAILED DESCRIPTION OF THE PREFERRED EMBODIMENTS

Figure 1:
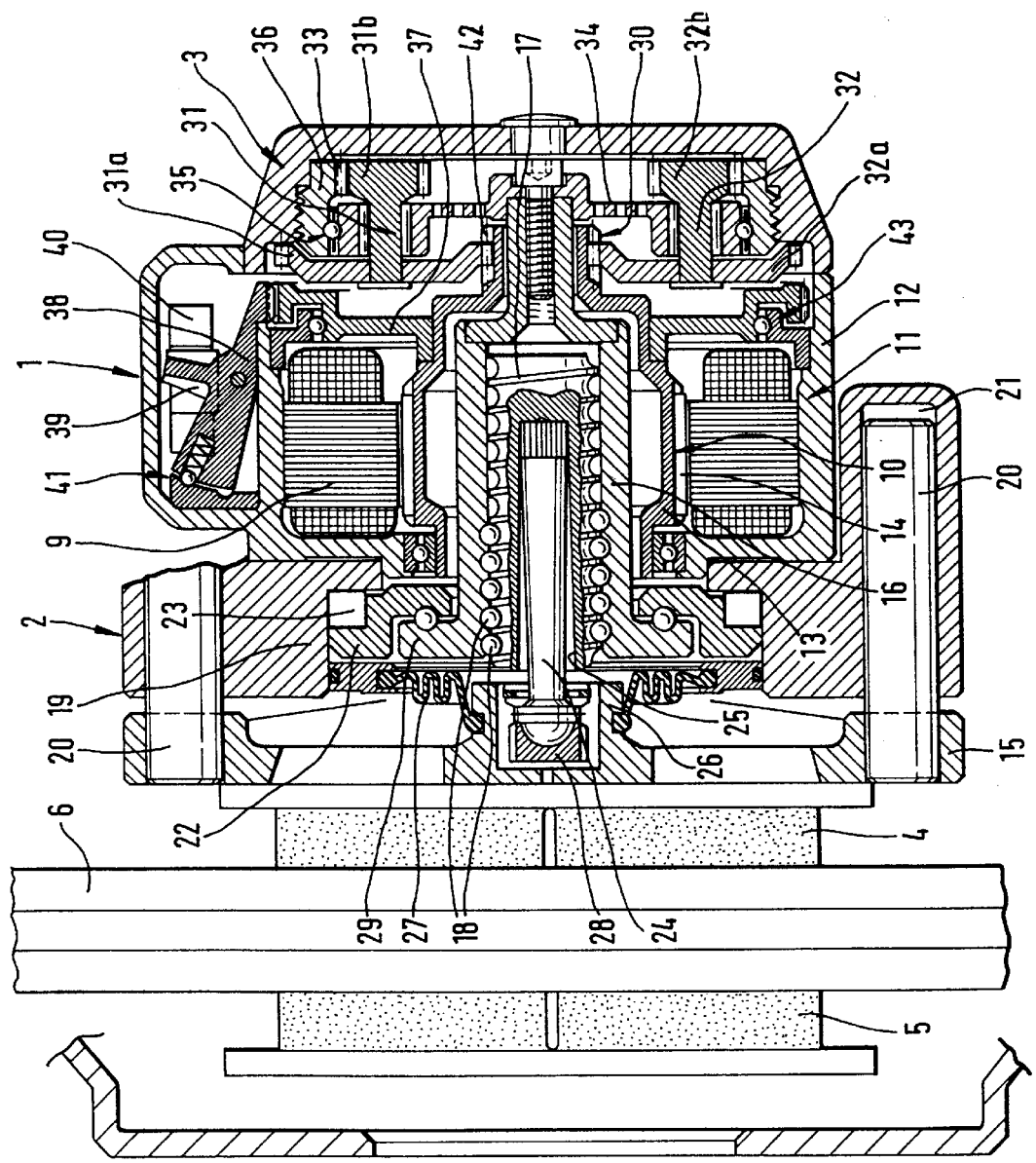
FIG. 1 is an axial cross-sectional view of a first embodiment of the electromechanical actuating unit of the present invention.

The electromechanical actuating unit of the present invention, as shown in the drawings, serves for actuating a floating-caliper disc brake whose brake caliper (shown only schematically) is slidably mounted in a stationary holder (not shown). A pair of friction linings 4 and 5 are arranged in the brake caliper so that they face the left and the right lateral surface of a brake disc 6.

Hereinbelow, the friction lining 4 shown on the right in the drawing is referred to as first friction lining, while the other friction lining, designated by reference numeral 5, is referred to as the second friction lining.

While the first friction lining 4 is movable into engagement with the brake disc 6 directly by the actuating unit by means of an actuating element 15, the second friction lining 5 is urged against the opposite lateral surface of the brake disc 6 by the effect of a reaction force generated by the brake caliper upon actuation of the arrangement.

The actuating unit of the present invention which is fitted to the brake caliper by way of fastening means (not shown) has a modular design and is basically composed of three assemblies or modules which can be handled independently, i.e., a drive unit 1, a first reduction gear 2 which actuates the first friction lining 4, and a second reduction gear 3 which is interposed between the drive unit 1 and the first reduction gear 2 in terms of effect.

The above-mentioned drive unit 1 is comprised of an electric motor 11 which, in the embodiment shown, is an electronically commutated motor energized by a permanent magnet, its stator 9 being immovably arranged in a motor housing 12, and its rotor 10 being formed of an annular carrier 13 that carries several permanent magnet segments 14. Arranged between the torque motor 11 and the above-mentioned Actuation Element 15 in terms of effect is the first reduction gear 2 which, in the embodiment shown, is configured as a ball-and-thread drive 16 to 18 mounted in a gear housing 19. The ball-and-thread drive is comprised of a thread nut 16 and a threaded spindle 17, and a plurality of balls 18 are arranged between the thread nut 16 and the threaded spindle 17 which circulate in a rotational movement of the thread nut 16 and initiate an axial or translatory movement of the threaded spindle 17. The gear housing 19 may also be designed in one part with the above-mentioned brake caliper.

The arrangement is preferably chosen such that the rotor 10 of the motor 11, by the intermediary of the second reduction gear 3, drives the thread nut 16, while the threaded spindle 17 by means of a push rod 24 cooperates with the above-mentioned actuating element 15 that is preferably provided by a force transmission plate supported on the first friction lining 4. The push rod 24 which is received in a conical bore 25 that is designed in the threaded spindle 17 is supported in a fashion fixed against rotation by means of a polygonal element 28 in an axial extension 26 of the force transmission plate 15, on the one hand, and on the bottom of the bore 25, on the other hand. In order to introduce the transverse forces which occur during operation of the actuating unit of the present invention into the gear housing 19, the force transmission plate 15 has two radially opposite guiding pins 20 which are guided in guiding surfaces or bores 21 provided in the gear housing 19. An axial bearing or ball bearing which is comprised of a radial collar 29 shaped on the thread nut 16, a plurality of balls (not referred to in detail), and a bearing ring 22 is used for the mounting support of the thread nut 16 in the gear housing 19. Arranged between the bearing ring 22 and an annular supporting surface designed in the gear housing 19 is a force sensor 23 which is used to determine the clamping force generated by the actuating unit. To protect the first reduction gear 2 against contaminants such as splash water, an elastic seal 27 which is configured as a cup seal in the embodiment shown is interposed between the force transmission plate 15 and the gear housing 19.

The necessary motor torque is reduced in the embodiment of the present invention shown in FIG. 1 by the expedient integration of a planetary gearing 30 to 34 which forms the above-mentioned second reduction gear 3. The planetary gearing which is arranged between the rotor 10 and the thread nut 16 in terms of effect, is comprised of a sun wheel 30 that is preferably formed by an externally toothed area 42 on the rotor 10, a plurality of stepped planet pinions (two of which are shown and designated by reference numerals 31 and 32), and a hollow wheel 33. The stepped planet pinions 31, 32 which are accommodated in a pinion cage 34 include a first step cooperating with the sun wheel 30 and a second step cooperating with the hollow wheel 33, with the first step being formed of planet pinions 31a, 31b of large diameter and the second step being formed of planet pinions 31b, 32b of smaller diameter. Preferably, the above-mentioned pinion cage 34 is so configured that its area disposed between the points of support of the planet pinions 31, 32 and the point of coupling of the thread nut 16 permits both a small axial and radial clearance and a small offset in angles and, for example, is designed as a lamellar disc or a pleated bellows. The hollow wheel 33 is provided by an internally toothed area of an outer ring 36 of a radial bearing 35 which is configured as a ball bearing in the embodiment shown, having an inner ring that is formed of the radially outward circumferential area of the pinion cage 34.

To achieve the function of a parking brake, the actuating unit of the present invention includes electromechanical means which cooperate with the rotor 10 of the electric motor 11 and permit its locking. In the embodiment shown in FIG. 1, the rotor 10 includes for this purpose a toothed rim 37, and a lock pawl 38 can be engaged with the toothing of rim 37. The electrical actuator system associated with the lock pawl 38 is designed in the type of a mechanical flipflop whose condition is changed with each short energization. In the embodiment shown, the lock pawl 38 is furnished with a permanent magnet 39 (shown only schematically) which is moved by means of a coil 40. Besides, the lock pawl 39 can be equipped with locking means, designated by reference numeral 41, that permit locking engagement of the lock pawl 39 in the actuated and the non-actuated position. It is especially suitable in this arrangement when the above-mentioned toothed rim is configured as a part of a radial bearing 43 in which rotor 10 is mounted. Besides, the toothed rim 37 may be configured as a part of a position detection system 46 (not shown in detail) which serves to determine the current position of the rotor 10. The information about the said position is then determined by means of a Hall sensor or a magnetoresistive element.

Figure 2:
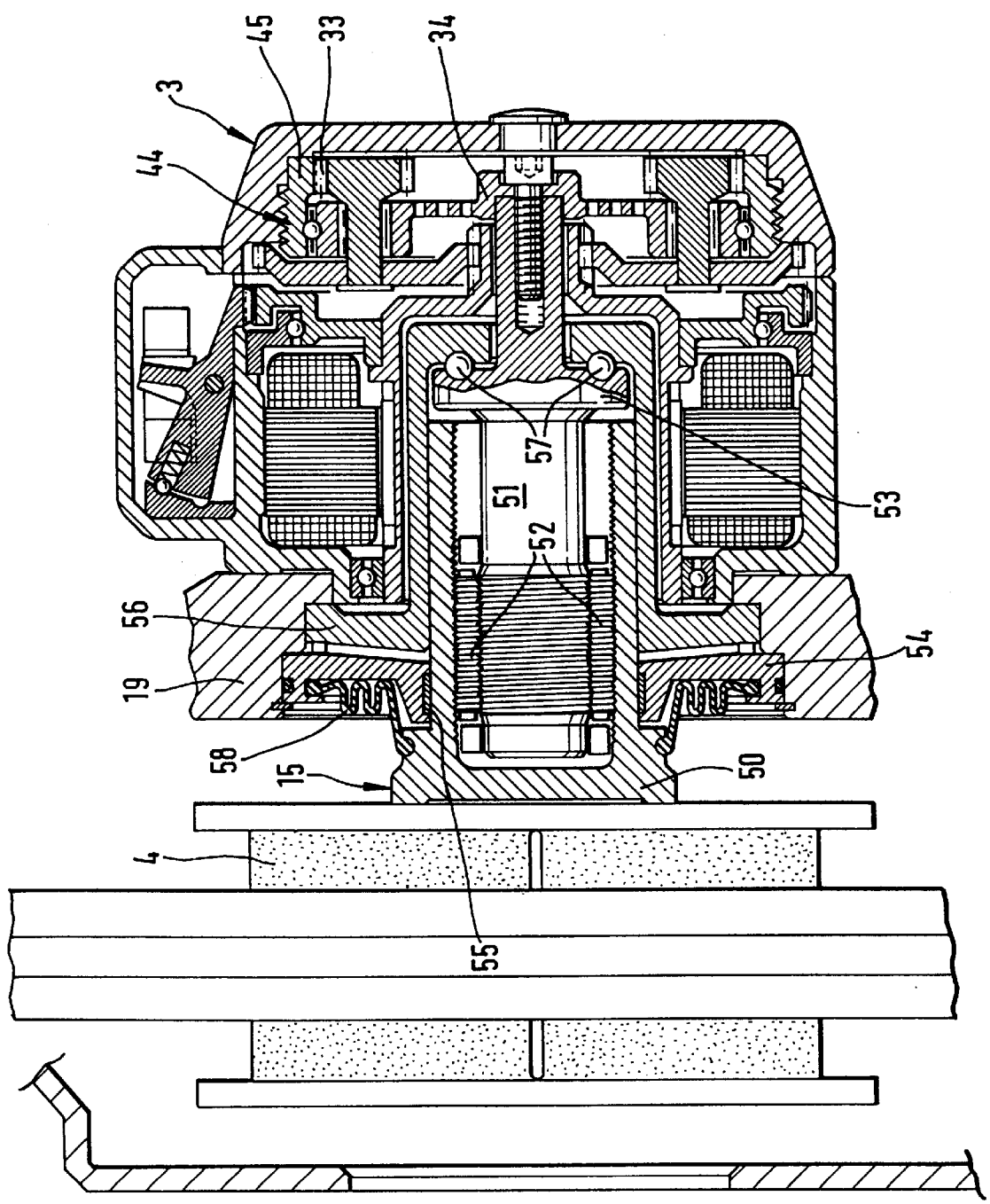
FIG. 2 is a view of a second embodiment of the object of the present invention in an illustration that corresponds to FIG. 1.

In the second embodiment of the object of the present invention illustrated in FIG. 2, the design of which largely corresponds to the embodiment of FIG. 1 and wherein like reference numerals have been assigned to like parts, the first reduction gear 2 is configured as a roller-and-thread drive, preferably, with an internal return arrangement of the rollers 52. The actuating element 15 mentioned with respect to FIG. 1 is provided by the thread nut 50 of the roller-and-thread drive which, in its area close to the first friction lining 4, is guided in a guiding ring 54 arranged in the gear housing 19. The transverse force is dissipated into the gear housing 19 by this measure. In order to improve the sliding properties of the guiding ring 54, the guiding ring 54 is furnished with a Teflon bushing 55. The design of the thread nut 50 is so that the diameter of its part that is guided in the guiding ring 54 is smaller than the diameter of its abutment surface that bears against the friction lining 4, whereby the necessary guiding length can be reduced. A threaded spindle 51 driven by the pinion cage 34 has a radial bead 53 of a large diameter by way of which it is axially supported on a bowl-shaped guiding element 56 that radially embraces the roller-and-thread drive. The arrangement is preferably chosen so that roll bodies, e.g. ball bearings 57, are arranged between the bead 53 and the area of the guiding element 56 facing the bead, so that an axial bearing is produced. The clamping force generated during the actuation can be determined by means of force measuring elements such as wire strain gauges (not shown) which are preferably fitted to the guiding element 56. A cup seal 58 which protects the roller-and-thread drive against contaminants is attached to the thread nut 50, on the one hand, and to the guiding ring 54, on the other hand. The radial bearing explained with respect to FIG. 1 for the mounting support of the pinion cage 34 is assigned reference numeral 44 in FIG. 2, while its outer ring has been given reference numeral 45. The design of the parking brake and the second reduction gear 3 corresponds exactly to the design described with respect to FIG. 1 and, consequently, need not be explained in detail.

Figure 3:
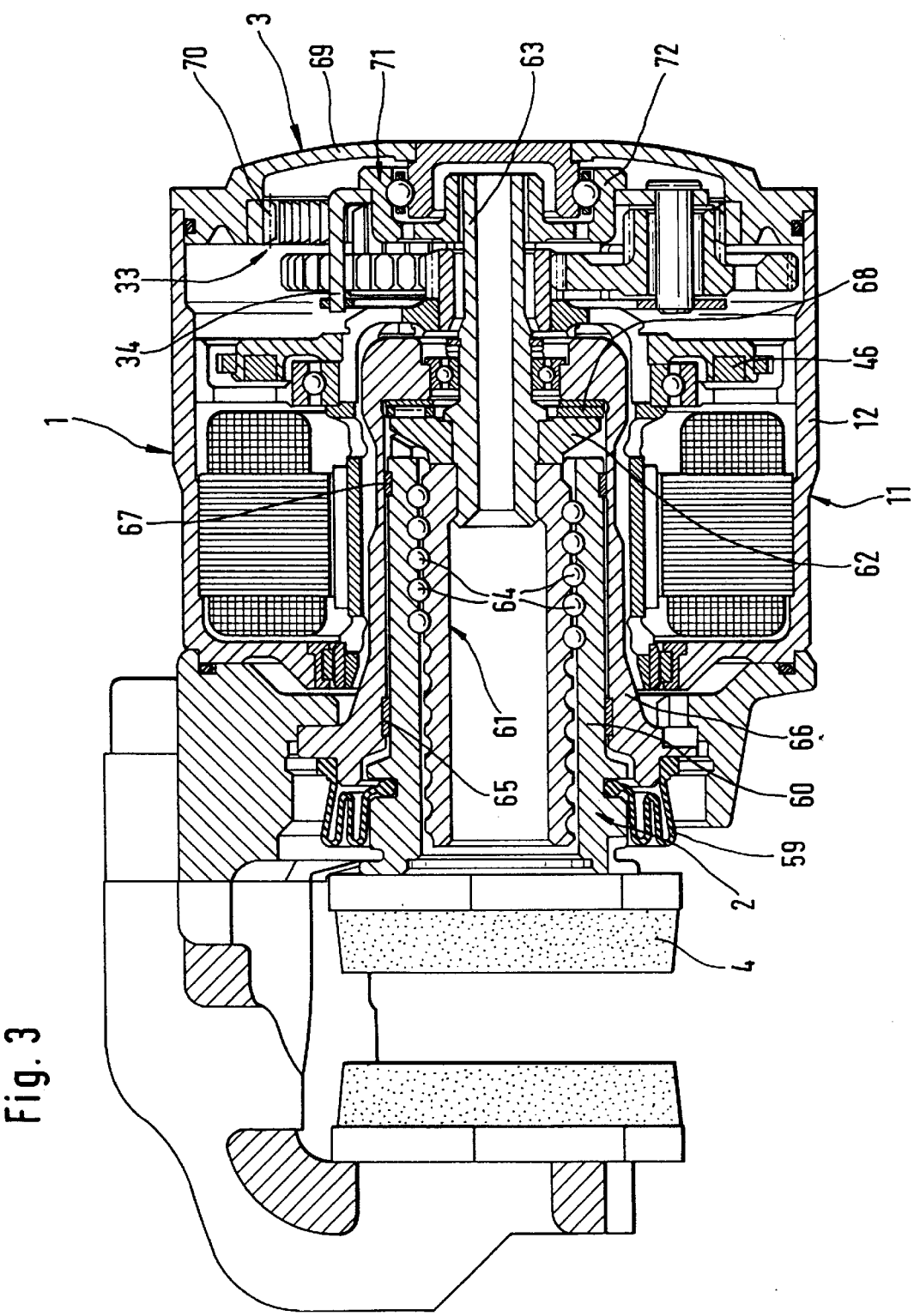
FIG. 3 is a view of a third embodiment of the electromechanical actuating unit of the present invention in an illustration that corresponds to FIG. 1.
Figure 4:
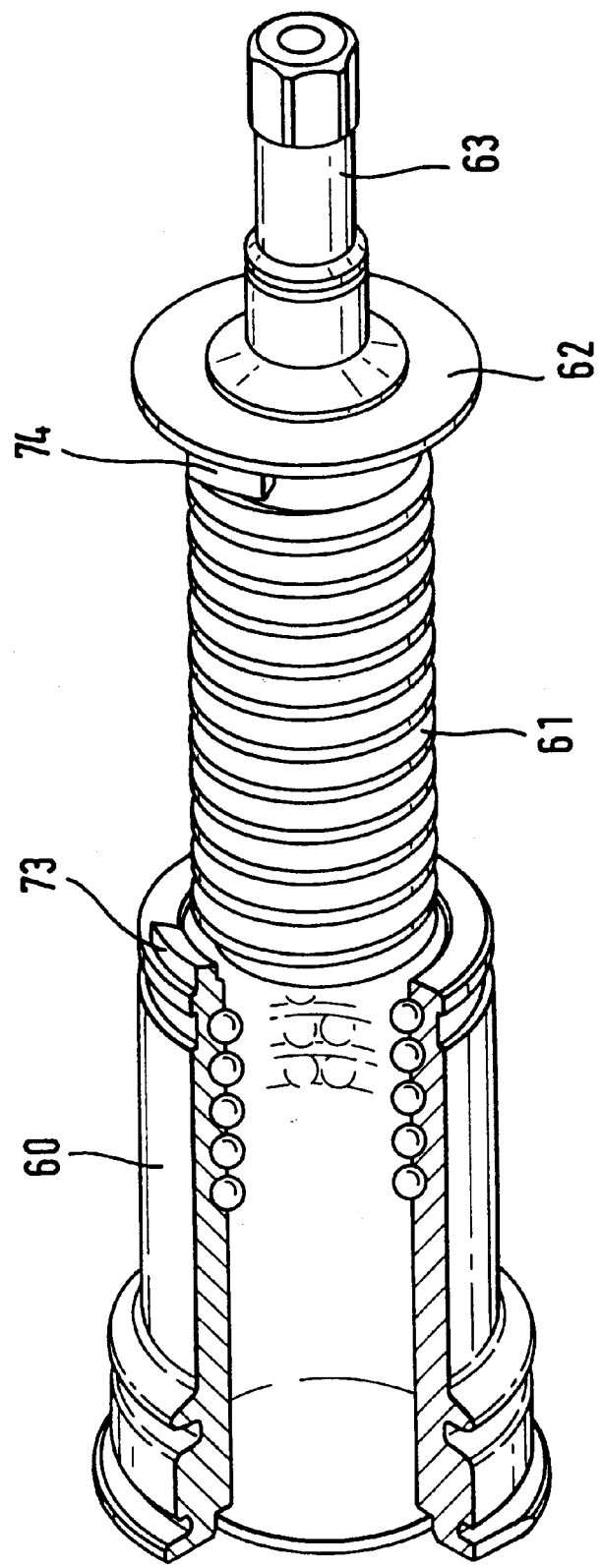
FIG. 4 is an exploded view showing the first reduction gear as used in the third embodiment according to FIG. 3.

In the third embodiment of the actuating unit of the present invention illustrated in FIGS. 3 and 4, a ball-and-thread drive is used as the first reduction gear 2, its thread nut 60 forming the above-mentioned actuating element. The mounting support of the thread nut 60 in the guiding element 66 is effected both in its area facing the first friction lining 4 by means of a first slide ring 65 arranged in the guiding element 66 and in its end area remote from the friction lining 4 by means of a second slide ring 67 arranged on the thread nut 60. Exactly as in the preceding embodiment, the second reduction gear 3 is configured as a planetary gearing with stepped planet pinions accommodated in a cover 69 forming its housing. Although it is possible to provide a one-part threaded spindle, the threaded spindle driven by the electric motor 11 by way of the second reduction gear has a three-part configuration in the embodiment shown and is comprised of a tubular first spindle part 61 that is in engagement with the thread nut 60 by means of a plurality of balls 64, an annular second spindle part 62 that is supported on an axial bearing 68 arranged within the guiding element 66, and a third spindle part 63 which is coupled to the pinion cage 34 of the second reduction gear 3 by means of a form-locking plug coupling. For this purpose, the end of the third spindle part 63 is e.g. designed as a "Torx" connection or a multi-faceted (e.g. sexagon) head which is slipped into a matingly shaped opening in the pinion cage 34. It is especially advantageous that the form-locking plug coupling is coupled to the pinion cage 34 in a torsionally resistant, radially yielding and flexible fashion. Coupling is carried out by means of an outer ring 72 of a radial bearing 71 provided in the cover 69, and a toothed area is desgined in the cover 69 and forms the hollow wheel 70 of the planetary gearing. An elastic cup seal 59 compressed between the thread nut 60 and the guiding element 66 prevents the ingress of contaminants into the interior of the ball-and-thread drive.

As can be taken from FIG. 4 in particular, the thread nut 60 at its end remote from the friction lining 4 includes an axial projection 73 which cooperates with a stop 74 designed on the periphery of the spindle part 61 when the thread nut 60 is reset. Further resetting of the thread nut 60 is reliably prevented by supporting a lateral surface of the projection 73 on the stop 74, so that the two parts 60, 61 will not get jammed.

Various modifications are of course possible in the spirit of the present invention. For example, the electric motor used as the drive unit 1 may be configured as a switch reluctance motor (SR motor). Different designs of the planetary gearing, such as a two-stage differential planetary gearing or a gear whose planet pinions, with their first step, are in engagement with a sun wheel and, with their second step, are in engagement with a hollow wheel by the intermediary of each one spur wheel are also possible. Of course, it is also suitable to use gears which achieve high reduction ratios by way of a deformable toothed ring and eccentricity.

What is claimed is:

1. An actuating unit for an electromechanically operable disc brake for automotive vehicles which is arranged on a brake caliper in which two friction linings that cooperate with each one lateral surface of a brake disc are arranged so as to be slidable within limits, wherein one of the friction linings is movable into engagement with the brake disc by means of an actuating element by the actuating unit directly, and the other friction lining is movable into engagement with the brake disc by the effect of a reaction force generated by the brake caliper, comprising:
    an electric motor,
    a second reduction gear functionally connected to a rotor of said motor
    a first reduction gear which is interposed between the actuating element and the second reduction gear, and wherein the electric motor rotor includes an annular design which radially embraces the first reduction gear, wherein the electric motor, the first reduction gear, and the second reduction gear are attached as at least two self contained assemblies which can be handled independently.

2. Actuating unit as claimed in claim 1, wherein the electric motor, the first reduction gear, and the second reduction gear are configured as each one assembly which can be handled independently.

3. Actuating unit as claimed in claim 1, wherein the second reduction gear is arranged on the side of the electric motor remote from the brake linings actuating element.

4. Actuating unit as claimed in claim 1, wherein the first reduction gear is configured as a roll-body and thread drive having a thread nut that cooperates with the second reduction gear.

5. Actuating unit as claimed in claim 1, wherein the first reduction gear is configured as a roll-body and thread drive whose threaded spindle cooperates with the second reduction gear.

6. Actuating unit as claimed in claim 4, wherein the first reduction gear is configured as a roller-and-thread drive assembly.

7. Actuating unit as claimed in claim 6, wherein the roller-and-thread drive is configured as a roller-and-thread drive with an inward roller return arrangement.

8. Actuating unit as claimed in claim 4, wherein the first reduction gear is configured as a ball-and-thread drive.

9. Actuating unit as claimed in claim 4, wherein the actuating element is in a force-transmitting connection with the threaded spindle of the roll-body and thread drive and is formed of a force transmission plate which is guided in an annular gear housing in which the roll-body and thread drive is incorporated.

10. Actuating unit as claimed in claim 9, wherein the force transmission plate includes at least two radially opposite guiding pins which are accommodated by correspondingly designed guiding surfaces or bores in the gear housing.

11. Actuating unit as claimed in claim 4, wherein the thread nut is axially supported on a bearing ring arranged in the gear housing.

12. Actuating unit as claimed in claim 4, wherein a force sensor is arranged between the bearing ring and the gear housing.

13. Actuating unit as claimed in claim 4, wherein a conical bore is incorporated in the threaded spindle of the ball-and-thread drive in which a push rod is received which serves to transmit pressure forces and the ends of which are supported in an axial extension of the force transmission plate or on the bottom of the bore in a torsionally fixed manner.

14. Actuating unit as claimed in claim 9, further including an elastic seal provided between the force transmission plate and the gear housing.

15. Actuating unit as claimed in claim 1, wherein the second reduction gear is configured as a planetary gear assembly.

16. Actuating unit as claimed in claim 15, wherein the second reduction gear is configured as a planetary gear assembly with stepped planet pinions.

17. Actuating unit as claimed in claim 16, wherein the planet pinions with their first step are in engagement with a sun wheel, while the planet pinions with their second step are in engagement with a hollow wheel, by the intermediary of each one spur wheel.

18. Actuating unit as claimed in claim 15, wherein the second reduction gear is configured as a two-step differential planetary gearing.

19. Actuating unit as claimed in claim 16, wherein the sun wheel of the planetary gearing is designed on the rotor, while the planet pinions are mounted in a pinion cage that is in a force-transmitting connection with the thread nut, and the planet pinions are comprised of one first large-diameter planet pinion that is in engagement with the sun wheel and each one smaller-diameter second planet pinion that is in engagement with a hollow wheel.

20. Actuating unit as claimed in claim 19, wherein the hollow wheel of the planetary gearing is formed of an internally toothed outer ring of a radial bearing in which the pinion cage is supported.

21. Actuating unit as claimed in claim 5, wherein the actuating element is the thread nut of the roll-body and thread drive.

22. Actuating unit as claimed in claim 21, further including a guiding element that embraces the thread nut and supported on the annular housing receiving the roll-body and thread drive, with the threaded spindle being axially supported on the guiding element.

23. Actuating unit as claimed in claim 22, wherein the axial support of the threaded spindle is effected by means of a radial bead by the intermediary of an axial bearing.

24. Actuating unit as claimed in claim 22, further including force-measuring elements arranged on the guiding element.

25. Actuating unit as claimed in claim 6, wherein the thread nut on its end close to the first friction lining is guided in a guiding ring.

26. Actuating unit as claimed in claim 25, further including an elastic seal interposed between the thread nut and the guiding ring.

27. Actuating unit as claimed in claim 16, wherein the sun wheel of the planetary gearing is provided on the rotor, while the planet pinions re mounted in a pinion cage that is in a force-transmitting connection with the threaded spindle and are respectively comprised of a first large-diameter planet pinion that is in engagement with the sun wheel and a second smaller-diameter planet pinion that is in engagement with a hollow wheel.

28. Actuating unit as claimed in claim 27, wherein the hollow wheel of the planetary gearing is formed of an internally toothed outer ring of a radial bearing in which the pinion cage is mounted.

29. Actuating unit as claimed in claim 27, wherein the hollow wheel of the planetary gearing is formed of an internal toothing which is provided in a cover that represents the casing of the planetary gearing and is arranged on the motor housing of the electric motor.

30. Actuating unit as claimed in claim 29, further including a form locking plug coupling for transmitting a force between the pinion cage and the threaded spindle.

31. Actuating unit as claimed in claim 30, wherein the pinion cage is mounted in the cover by means of a radial bearing.

32. Actuating unit as claimed in claim 30, wherein the form-locking plug coupling is coupled to the pinion cage in a torsionally resistant, radially yielding and flexible manner.

33. Actuating unit as claimed in claim 27, wherein the threaded spindle has a one-part design.

34. Actuating unit as claimed in claim 27, wherein the threaded spindle has a multi-part design.

35. Actuating unit as claimed in claim 22, wherein the thread nut at an end remote from the first friction lining includes a projection which is movable into abutment on a stop that is designed on the threaded spindle and acts in a circumferential direction.

36. Actuating unit as claimed in claim 1, further including electromechanical means for mechanically locking the rotor of the electric motor.

37. Actuating unit as claimed in claim 35, wherein the means is formed of a toothed rim connected to the rotor and an electromagnetically operable lock pawl.

38. Actuating unit as claimed in claim 26, wherein the lock pawl includes catching means which permit locking engagement both in the actuated and the non-actuated position.

39. Actuating unit as claimed in claim 1, wherein the electric motor is configured as an electronically commutated electric motor enegized by a permanent magnet.

40. Actuating unit as claimed in claim 1, wherein the electric motor is configured as a switch reluctance motor.

41. Actuating unit as claimed in claim 1, further including a position detection system which detects the position of the motor rotor.

42. Actuating unit as claimed in claim 41, wherein the position detection system includes a Hall sensor.

43. Actuating unit as claimed in claim 41, wherein the position detection system includes a magnetoresistive element.

* * * * *

UNITED STATES PATENT AND TRADEMARK OFFICE
CERTIFICATE OF CORRECTION

PATENT NO. : 6,405,836 B1
DATED : June 18, 2002
INVENTOR(S) : Reith et al.

It is certified that error appears in the above-identified patent and that said Letters Patent is hereby corrected as shown below:

Column 10,
Line 48, change "motor enegized by" to -- motor energized by --.

Signed and Sealed this

Eighteenth Day of February, 2003

JAMES E. ROGAN
*Director of the United States Patent and Trademark Office*